United States Patent Office 3,000,722
Patented Sept. 19, 1961

3,000,722
COMPOSITION FOR SUPPORTING AND EXTENDING THE LIFE OF CUT FLOWERS
Alexander Linnolt, Ballston Spa, N.Y., assignor to Tufflite Plastics, Inc., Ballston Spa, N.Y., a corporation of New York
No Drawing. Filed June 23, 1958, Ser. No. 743,969
6 Claims. (Cl. 71—11)

This invention relates to a composition of material adapted to be placed in vases or other containers in which cut flowers are to be held, for the purpose of supporting the flowers, and when the vase or other container is filled with water, reacting with the water in such a way as to extend the life of the flowers supported therein.

When flowers are cut and placed in vases or other containers and water only placed on their lower ends, it is quite difficult to get the flowers to stay in the position in which it is desired to have them, and furthermore, after a relatively short time the water becomes foul and the flowers lose their freshness.

Many devices have been proposed for holding cut flowers in place in vases or other containers and numerous ingredients have been proposed for addition to the water surrounding the stems of cut flowers to nourish the flowers and provide a longer life for them.

This invention improves upon the earlier methods of holding the flowers in position and at the same time provides an expedient method and means to keep the water fresh for a longer period of time and keep the flowers fresh for a longer period of time.

In accordance with this invention, it has been found that expanded polystyrene, often called polystyrene foam, is particularly useful. It has been discovered that if a polystyrene foam of a density of about 1 to 2 pounds per cubic foot and with the cell size of about 0.01 to 0.1 inch in diameter is cut into relatively small pieces with a length of about 1 to 5 inches and a width of ¼ to ¾ inch and a thickness of about ⅛ to ¼ inch, that the cuttings will be flexible enough so that they can be pressed together to form a light porous filler which can be placed into a vase or other container. When the stems of flowers are pushed into this material, it tends to support them quite firmly and the polystyrene tends to give off a very small amount of methyl chloride, which is normally incorporated therein during the manufacturing process, and this tends to keep both the water and the flowers fresh. By the addition of plant foods and mineral salts and the like, the results may be even further improved.

Further advantages of this invention will be apparent from the following description of certain examples of the use of this material.

Example I

Two similar glass vessels were chosen for this example. One of the vessels was filled with cuttings of expanded polystyrene of the characteristics set forth above, the cuttings having been randomly pressed into the vessel so as to form a relatively complete filling for the lower part.

Rose cuttings were next placed in each of the vessels with the stems projecting down into the expanded polystyrene cuttings in the one containing them. The vessels were filled with water to a point above the cuttings, the same amount being placed in each vessel.

After five days, the water of both vessels was drained. The water from the vessel without the polystyrene cuttings was colored yellow and contained floating plant substance and had a smell of decay. The water from the vessel containing the cuttings was colorless, clear and without objectionable smell. The water from the vessel containing the expanded polystyrene contained about two parts per million of chloride, whereas the vessel that did not contain expanded polystyrene contained only about 0.3 part per million of chloride. The glass containing expanded polystyrene had a pH of 5.3 and that containing no polystyrene had a pH of 7.5.

Example II

Using expanded polystyrene cuttings as a base, the following formulation was compounded:

| | Parts by weight |
|---|---|
| Expanded polystyrene cuttings | 90 |
| Cane sugar | 3.5 |
| Aluminum sulphate | 2.5 |
| Potassium nitrate | 1.5 |
| Diammonium phosphate | 1.5 |
| Calcium oxide | 0.5 |
| Ferric chloride | 0.2 |
| Manganese sulphate | 0.1 |
| Boric acid | 0.1 |
| Sodium silicate | 0.1 |

This was used one ounce to one quart of water. A series of other formulations were also prepared leaving out one or more of the above ingredients.

A series of tests were made using the various formulations, one ounce to one quart of water based on complete composition, to hold fresh cut roses with the blooms half closed. The time was measured in days until the petals of the flowers fell down. The following were the results:

| | Days |
|---|---|
| Complete composition | 5 |
| Composition less sugar | 4 |
| Composition containing only expanded polystyrene cuttings and cane sugar | 5 |
| Composition containing only expanded polystyrene cuttings | 3 |
| Composition containing all ingredients except expanded polystyrene cuttings | 2½ |
| Composition containing only the inorganic materials and no sugar or expanded polystyrene cuttings | 3 |
| Composition containing only sugar | 2 |
| Water only | 2 |

Example III

One quite satisfactory formulation for composition according to this invention consists of 90 parts of expanded polystyrene ground to a size of approximately ¼ inch by ½ inch by 2 inches, 3 parts of cane sugar, 3 parts of potassium chloride and 4 parts of diammonium phosphate.

It will be apparent from the above that the expanded polystyrene cuttings perform the functions of holding the flowers in the desired position, extending the time until the water becomes stale and, keeping the flowers fresh for a longer time. It will also be apparent that sugar and the various inorganic chemicals listed also are useful in extending the life of the flowers being displayed. The foregoing examples, however, are but examples and it is not intended to limit the scope of this invention except as stated in the appended claims.

What is claimed is:

1. A composition for supporting cut flowers in a container in the presence of water that comprises expanded polystyrene of a density of around 1 to 2 pounds per cubic foot and a cell size of around 0.01 to 0.1 inch, the expanded polystyrene being in the form of cut particles having a size of around 1 to 5 inches in length, ¼ to ¾ inch in width and ⅛ to ¼ inch in thickness.

2. A composition for supporting cut flowers in a container in the presence of water which composition comprises around 90 parts by weight of expanded polystyrene cuttings the particles of which are approximately ¼ by ½ by 2 inches, about 3 parts by weight of cane sugar, about 3 parts by weight of potassium chloride and about 4 parts by weight of diammonium phosphate.

3. A composition as defined in claim 1 which further comprises minor amounts of mineral salts of potassium, phosphorus, nitrogen and cane sugar.

4. A composition as defined in claim 1 which further includes minor amounts of organic plant nutrients.

5. A composition as defined in claim 1 which further includes minor amounts of mineral salts and organic plant nutrients.

6. A composition for supporting cut flowers in a container in the presence of water which comprises about 90 parts by weight of expanded polystyrene of a density of around 1 to 2 pounds per cubic foot and a cell size of about 0.01 to 0.1 inch, said expanded polystyrene being in the form of cut flexible particles whose dimensions are approximately ¼ by ½ by 2 inches, about 3 parts by weight of cane sugar, about 3 parts by weight of potassium chloride and about 4 parts by weight of diammonium phosphate.

References Cited in the file of this patent

UNITED STATES PATENTS

| | | |
|---|---|---|
| 2,601,658 | Bussert | June 24, 1952 |
| 2,753,277 | Smithers | July 3, 1956 |
| 2,774,187 | Smithers | Dec. 18, 1956 |
| 2,891,355 | Nelson | June 23, 1959 |

OTHER REFERENCES

"American Journal of Botany," volume 16, June 1929, pages 433 to 440.